United States Patent
Takachio et al.

(10) Patent No.: US 6,545,780 B1
(45) Date of Patent: Apr. 8, 2003

(54) WAVELENGTH ALLOCATION METHOD, A TRANSMISSION EQUIPMENT AND RECEIVING EQUIPMENT USING THIS METHOD AND A WAVELENGTH DIVISION MULTIPLEX TRANSMISSION SYSTEM

(75) Inventors: Noboru Takachio, Tokyo (JP); Masafumi Koga, Tokyo (JP); Shoko Ohteru, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/295,452

(22) Filed: Apr. 21, 1999

(30) Foreign Application Priority Data

Apr. 22, 1998 (JP) .......................................... 10-112270

(51) Int. Cl.$^7$ .............................................. H04J 14/02
(52) U.S. Cl. ...................................... 359/124; 359/188
(58) Field of Search .................................. 359/124, 188

(56) References Cited

U.S. PATENT DOCUMENTS

| 5,793,508 A | 8/1998 | Meli | |
|---|---|---|---|
| 6,366,376 B1 | * 4/2002 | Miyata et al. | 359/124 |

FOREIGN PATENT DOCUMENTS

| JP | 7-107069 | | 4/1995 | |
| JP | 07-26416 | | 10/1995 | |
| JP | 7-264166 | | 10/1995 | |
| JP | 8-171109 | | 7/1996 | |
| JP | 8-256128 | | 10/1996 | |
| JP | 09-121204 | | 5/1997 | |
| JP | 9-247091 A | * | 9/1997 | H04B/10/02 |
| JP | 10-190627 | | 7/1998 | |
| JP | 11-154934 | | 6/1999 | |

OTHER PUBLICATIONS

Lee, et al., "Periodic Allocation Of A Set of Unequally Spaced Channels for Upgradable Dens–WDM Applications Using Dispersion Shifted Fibers", OFC '98 Technical Digest, pp. 393–394 (1998).

Patent Abstracts of Japan: Optical Wavelength Multiplex Transmission System and Optical Dispersion Compensation System (Publication No.: 07107069A).

Patent Abstracts of Japan: Optical Frequency Arrangement Method (Publication No.: 08171109A).

Patent Abstracts of Japan: Lightwavelength Multiplex Communication Device (Publication No.: 08256128A).

(List continued on next page.)

*Primary Examiner*—Leslie Pascal
*Assistant Examiner*—Christina Y Leung
(74) *Attorney, Agent, or Firm*—Burns, Doane, Swecker & Mathis L.L.P.

(57) ABSTRACT

By using a combination of a plurality of completely unequally spaced channel allocations, the influence of four wave mixing is mitigated even while it is incompletely unequally spaced channel allocation, and it is possible both to decrease the occupied bandwidth and increase the number of channels. A plurality of completely unequally spacing channel allocations are combined, and the number of channels changes depending on the amount of scattering of an optical fiber and the frequency that there exists zero dispersion wavelengths on a transmission path. The completely unequally spaced channel allocations of $N_1$-channels in a first wavelength region including the zero dispersion wavelength $\lambda_0$ or the mode zero dispersion wavelength $\lambda_A$ are partitioned, and then in sequence the completely unequally spaced channel allocation of $N_2$-, $N_3$-, . . . , channels is partitioned, and the wavelength interval of N channels is set by combining all or a part thereof (where $N_1 \geq N_2 24 \ldots > N_j \geq N_{k-1} \geq N_k$).

19 Claims, 5 Drawing Sheets

OTHER PUBLICATIONS

Seamless 32×10Gb/s transmission over 320 km of 1.55 μm dispersion shifted fiber using wavelength ranging from 1546 nm to 1587 nm.
Periodic allocation of a set of unequally spaced channels for upgradable dense–WDM applications using dispersion-–shifted fibers (OFC '98 Technical Digest, pp. 393–394).
Performance behaviour of WDM transmission on G.653 fibers; Source: Lucent Technologies Germany; Feb. 1998.
41 nm–seamless, 32 × 10Gb/s WDM Transmission Using Distributed Raman Amplification.
A 10Gb/s, 22–channel WDM Transmission Characteristics on DSM Cables Using Unequal Channel Spacing.

* cited by examiner

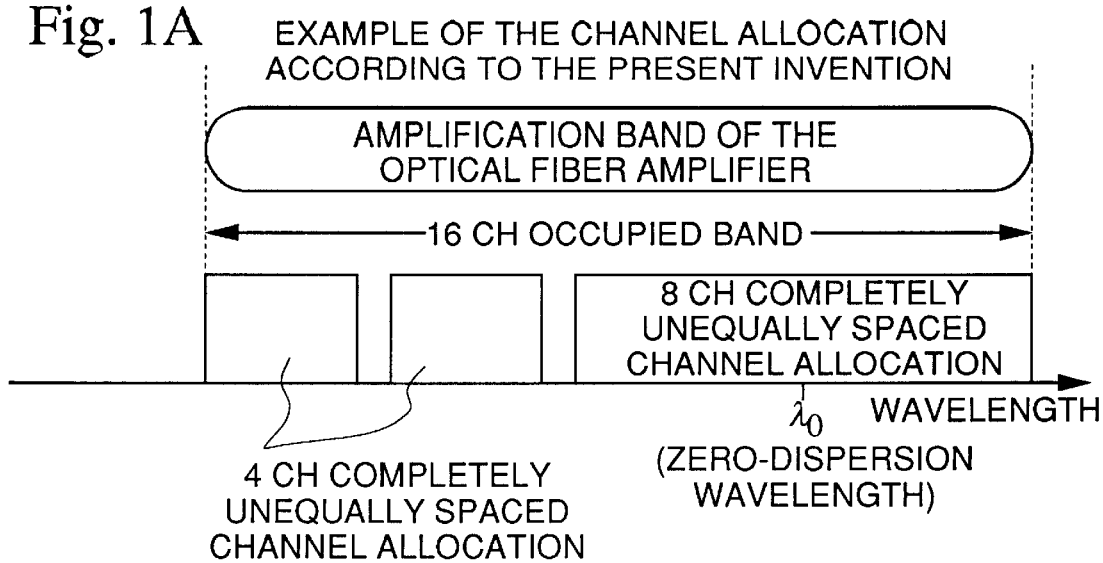
Fig. 1A  EXAMPLE OF THE CHANNEL ALLOCATION ACCORDING TO THE PRESENT INVENTION
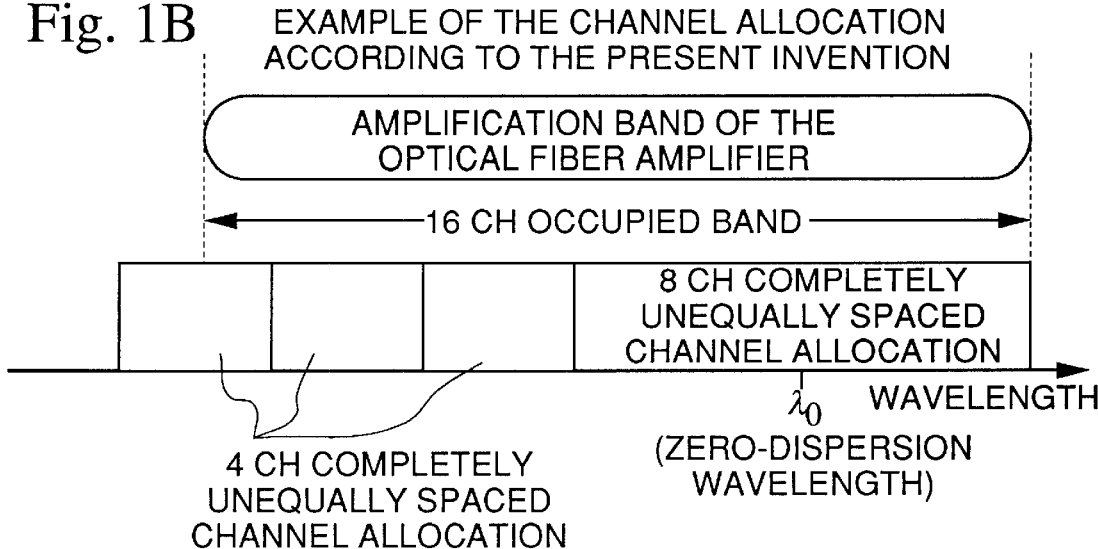
Fig. 1B  EXAMPLE OF THE CHANNEL ALLOCATION ACCORDING TO THE PRESENT INVENTION
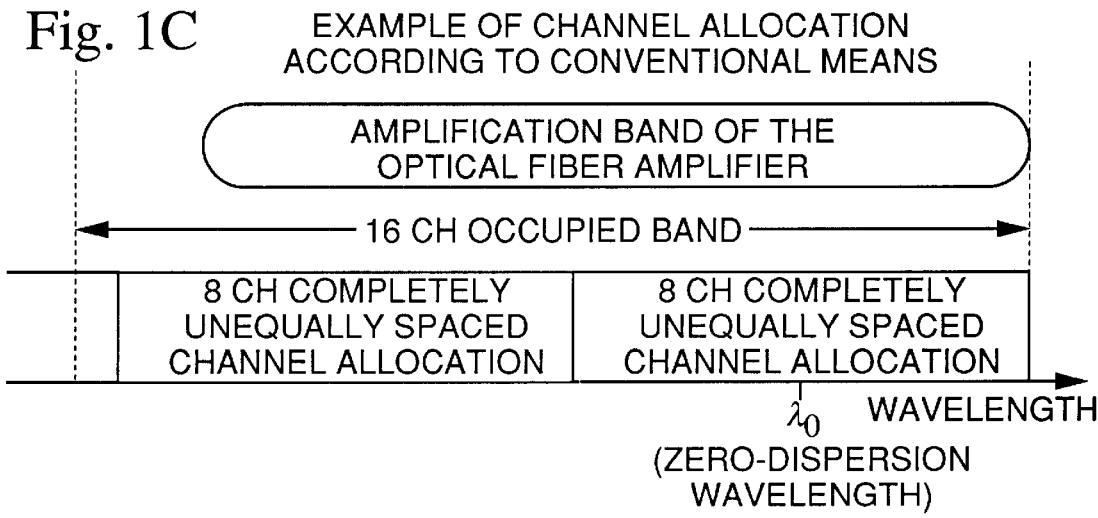
Fig. 1C  EXAMPLE OF CHANNEL ALLOCATION ACCORDING TO CONVENTIONAL MEANS AN EXAMPLE OF A HISTOGRAM OF THE ZERO-DISPERSION WAVELENGTH OF A 1.55μm DISPERSION SHIFTED FIBER.

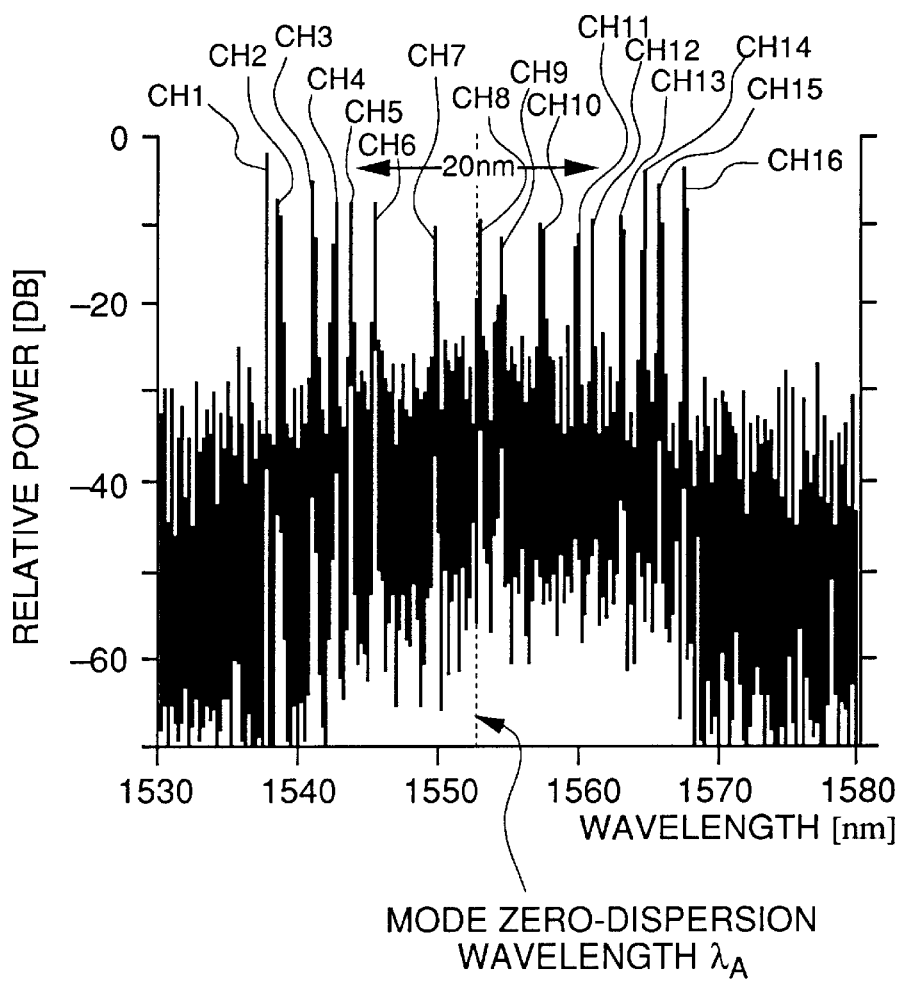

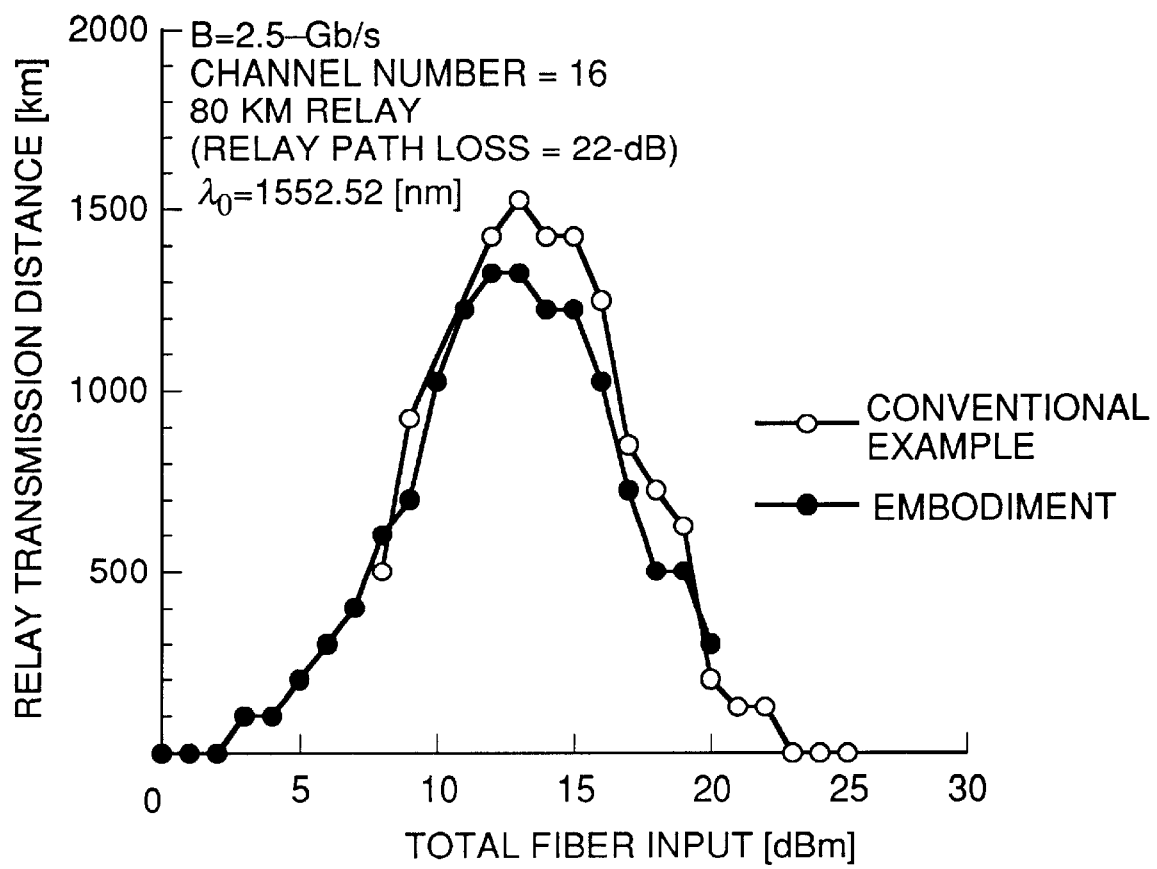

WAVELENGTH ALLOCATION METHOD, A TRANSMISSION EQUIPMENT AND RECEIVING EQUIPMENT USING THIS METHOD AND A WAVELENGTH DIVISION MULTIPLEX TRANSMISSION SYSTEM

BACKGROUND OF THE INVENTION

1. Field of the Invention

The present invention relates to a wavelength allocation method using wavelength division multiplexing (WDM) technology, a transmission equipment and receiving equipment using this method, and a wavelength multiplex transmission system, and in particular, a wavelength allocation method which carries out wavelength multiplexing by allocating the carrier frequency (hereinbelow, referred to as "frequency") of the signal beam of each channel with unequal spacing in order to mitigate the influence of non-linear effects of the optical fiber, a transmission equipment and a receiving equipment using this method, and a WDM transmission system.

2. Background Art

In a 1.55 μm dispersion shifted fiber, the zero-dispersion wavelength is set in the region of 1.55 μm, which is around the signal frequency, so that waveform distortion is not produced by fiber chromatic dispersion, and thereby, this fiber can also be applied on high speed transmission.

However, when shifted fiber is employed to WDM systems, because the wavelength dispersion in the signal wavelength is small, there is the problem that a new optical power that is newly generated by four wave mixing, which is one of the nonlinear effects of an optical fiber, becomes large. When this newly generated four wave mixing light has the same frequency as the signal frequency, this four wave mixing light becomes noise, and transmission distance is restricted. In order to relieve this problem, a method of unequally allocating the frequency intervals of the signal frequency has been proposed.

Here, let the frequencies of the four wave mixing light generated from three signal light with frequencies $f_i$, $f_j$, and $f_k$ (k≠i, j) be expressed by $f_{ijk}$. Next equation is satisfied, $$f_{ijk}=f_i+f_j-f_k \qquad (1)$$

FIGS. 6A and 6B shows the position where the four wave mixing light is generated. In FIGS. 6A and 6B, the frequencies of the signal light in Channels 1, 2, and 3 are $f_1$, $f_2$, and $f_3$, respectively. 12 four wave mixing lights are generated.

FIG. 6A shows the four wave mixing light when the frequencies of each signal beam are allocated with equal spacing. For example, $f_{223}$ denotes the frequencies of the four wave mixing light when $f_i=f_j=f_2$, and $f_k=f_3$, and shows that the four wave mixing light generated by the signal beams of channels 2 and 3 overlaps the signal beam of channel 1. This is identical for $f_{132}$, $f_{312}$, and $f_{221}$. Because this kind of four wave mixing light cannot be separated from the signal light using, for example, an optical filter, it generates cross-talk in the signal beam, and the S/N ratio is degraded.

FIG. 6B shows the four wave mixing light when the frequencies of each signal beam are unequally spaced. As shown here, by unequally spacing the frequencies of each signal, the each signal frequency and the frequencies of the four wave mixing light do not coincide, it becomes possible to separate with optical filters, and the influence of the four wave mixing light can be decreased. Moreover, in the present specification, the frequency interval of any two arbitrary channels is different from the frequency intervals of all other pairs of channels, and the frequency interval of signal beams being set so that the frequencies of the signal beams and the four wave mixing light do not coincide at all is called "completely unequally spaced channel allocation".

An algorithm that determines the frequency interval based on this type of completely unequally spaced channel allocation is disclosed in Japanese Patent Application, First Publication, No. Hei 7-264166 (Japanese Patent Application, No. Hei 7-29043; "Multiplexed Channel Optical Fiber Communication System"). Below this algorithm will be briefly explained.

The theorem of this algorithm is to assign frequency intervals such that the frequency interval i of any two arbitrary signal beams is different from all other pairs of frequency intervals. This can be understood by modifying Eq. 1 to:

$$f_{ijk}-f_i=f_j-f_k \qquad (2)$$

Here, if the number of channels (number of channels) is M, $m_{i-1}$ (2≦i≦M) is an integer, and the minimum frequency difference of the four wave mixing light is Δf, then the frequency $f_i$ of each signal beam is expressed by:

$$f_i=f_{i-1}m_{i-1}\times\Delta f \qquad (3)$$

In this case, the frequency interval of any two arbitrary channels is the partial sum of the integers $m_1 \sim m_{M-1}$ multiplied by Δf, and the problem of finding a frequency interval that is a completely unequally spaced channel allocation comprises finding the M−1 integers whose arbitrary partial sums are all different. Here, partial sum means the sum of $m_{i-1}$, which represents the frequency separation of any two arbitrary channels among the M−1 integers $m_{i-1}$. For example, this denotes $m_1$, $m_2$, $m_1+m_2$, $m_3+m_4+m_5+m_6$, etc.

Moreover, the signal beam along with the minimum frequency difference Δf of the four wave mixing and the minimum frequency separation (the minimum value of $m_{i-1}\times\Delta f$) of the signal light are determined in consideration of the degree of stability of the oscillating frequency of the semi-conductor laser using as an optical source, the spectral spread of the signal light and the four wave mixing light, the transmission bandwidth of the optical filter, the optical amplifier bandwidth used as a repeater, etc., and Δf and $m_{i-1}$ are assigned the greatest lower limit.

In connection with the above, presently completely unequally spaced channel allocation has only been obtained up to 12 channels. Therefore, when the unequally spaced channel allocation is expanded, for example, to 16 channels, a method of repeatedly disposing completely unequally spaced channel allocation of 8 channels has been proposed as a alternative means (see J. S. Lee et al., "Periodic allocation of a set of unequally spaced channels for upgradable dense-WDM application using dispersion-shifted fibers", OFC '98, FC 5, 1998).

In general, optical fiber amplifiers bandwidth is limited, for example, to 1529~1560 nm. In addition, the bandwidth is decreased by cascading. In addition, when the difference between the wavelength of the signal light and the zero dispersion wavelength becomes large, waveform degradation due to the chromatic dispersion becomes large.

Because of this, it is preferred that the frequency bandwidth that M signal beams with completely unequal spaced channel allocation occupy (referred to hereinbelow as "occupied bandwidth") be as narrow as possible. In the above-mentioned publication, since the occupied bandwidth of these M signal beams is given as $(m_1+m_2+ \ldots m_{M-1}) \times \Delta f$, a theorem is disclosed wherein the frequency interval of the completely unequally spaced channel allocation is set so that $m_1+m_2+ \ldots m_{M-1}$ is at a minimum.

Here, one example of completely unequally spaced channel allocation for 8 channels which minimizes the occupied bandwidth when the minimum frequency difference $\Delta f$, between the signal and the four wave mixing light is 50 GHz and the minimum frequency interval (minimum channel allocation) is 3 $\Delta f$ =150 GHz, is shown in Table 1.

As is clear from this Table, in the completely unequally allocated 8 channels, 2.15 (=194.45–192.30) THz is necessary for the occupied bandwidth, and it is understood that this is a great increase compared to the 1.05 (=150 GHz×7) occupied bandwidth in the case of an even allocation by minimum channel allocation.

In addition, the minimal occupied bandwidth necessary for completely unequally spaced channel allocation increases according to the number of channels as shown in FIG. 2, where $\Delta f$=50 GHz, and the minimum channel allocation of 3$\Delta f$=150 GHz. Moreover, in the following explanation, the occupied bandwidth is represented by wavelength. That is, the occupied bandwidth of a completely unequally spaced channel allocation for 8 channels is 17.23 (=1558.98–1541.75) nm.

As is clear from this Table, in contrast to the 4.8 nm occupied bandwidth of completely unequally spaced channel allocation for 4 channels, the occupied bandwidth of completely unequally spaced channel allocation for 8 channels is three times as high, and the occupied bandwidth of completely unequally spaced channel allocation for 12 channels is 9 times this. That is, when attempting to increase the number of channels with completely unequally spaced channel allocation, the occupied bandwidth increases drastically, and exceeds the 1529~1560 nm range, which is the amplification band of the general use optical fiber amplifier.

In addition, even when the unequally spaced channel allocation is expanded to 16 channels by repeatedly allocating the completely unequally spaced channel allocation of 8 channels as in the above-mentioned publication, as is shown in FIG. 1A, the occupied bandwidth becomes greater than 17.23×2 [nm], exceeding the amplification bandwidth (about 30 nm) of generally used optical fiber amplifiers, and there is the problem that channels are produced that cannot be amplified.

Furthermore, when combining a plurality of completely unequally spaced channel allocations as in the above-mentioned publication, the entire frequency will not be completely unequally spaced channel allocation. Therefore, for example, when the completely unequally spaced channel allocation of 4 channels is expanded to 16 channels by combining 4 of them, the occupied bandwidth can be accommodated by the amplification band of the generally used optical fiber amplifier, but the unequally spaced channel allocation becomes incomplete, and there is the problem that it is not possible to completely separate the four wave mixing light from the signal beam.

Thus, the expansion of the number of channels with completely unequally spaced channel allocation is limited due to the increase of this occupied bandwidth. In addition, in the simple combination of a completely unequally spaced channel allocation, the influence of four wave mixing light due to incompletely unequally spaced channel allocation becomes large.

SUMMARY OF THE INVENTION

In consideration of the above, it is an object of the present invention to provide a wavelength allocation method, with a transmission equipment and a receiving equipment using this method, and a WDM transmission system wherein the influence of the four wave mixing light can be mitigated even while there is incompletely unequally spaced channel allocation by devising a plurality of completely unequally spaced channel allocation combinations, and make possible both a decrease in the occupied bandwidth and an increase in the number of channels.

The first characteristic of the present invention is that much of the power of the four wave mixing light is generated by the signal beam in the zero dispersion wavelength region of the optical fiber, and that it decreases with increased distance from the zero dispersion wavelength. Based on this, completely unequally spaced channel allocations is combined.

For example, when transmitting on a wavelength multiplexed signal beam in the 1.55 $\mu$m band with a 1.55 $\mu$m dispersion shifted optical fiber, completely unequally spaced channel allocation of all channels is preferred, but as described above, there are cases in which the occupied bandwidth exceeds the amplification band. Therefore, a plurality of completely unequally spaced channel allocations are combined, and further, the number of channels with completely unequally spaced channel allocation in the wavelength range separated from the zero dispersion wavelength is minimized, and the total occupied band is made narrow. Thereby, it is possible to partition many channels in a limited occupied bandwidth. For example, in the relationship between the number of channels and the occupied bandwidth shown in Table 2, when wavelength multiplexing 16 channels, by combining a completely unequally spaced channel allocation of 8 channels and a completely unequally spaced channel allocation of 4 channels, it is possible to keep the total occupied bandwidth to 30 nm or less.

However, as shown in FIGS. 1A and 1B, the completely unequally spaced channel allocations of 8 channels in the zero dispersion wavelength $\lambda_0$ are partitioned, and the completely unequally spaced channel allocation for 4 channels separated from the zero dispersion wavelength are partitioned. In FIG. 1A, by providing a predetermined wavelength allocation between each completely unequally spaced channel allocation, the wavelength allocation for 16 channels is set by one completely unequally spaced channel allocation for 8 channels and two completely unequally spaced channel allocations for 4 channels. In FIG. 1B, by sharing the neighboring channels of each completely unequally spaced channel allocation (the wavelength allocation of the completely unequally spaced channel allocation is 0), wavelength interval for 16 channels is set by one completely unequally spaced channel interval for 8 channels, two completely unequally spaced channel allocation for 4 channels, and part of a completely unequally spaced channel allocation for 4 channels.

The present invention is characterized in that when $$N_1 \geq N_2 \geq N_3 \geq \ldots > N_j \geq N_{k-1} \geq N_k,$$

the $N_1$-channels are selected so as to be completely unequally allocated in the first wavelength region including the zero dispersion wavelength $\lambda_0$, and then in the next wavelength regions adjacent to it, $N_2$-channels, $N_3$-channels, etc., which are smaller than $N_1$ are completely unequally allocated, and by their combination, a wavelength interval for N-channels that can carry out wavelength multiplexed transmission is established. That is, the number of channels of the completely unequally spaced channel allocation changes depending on the amount of the dispersion (the difference with the zero dispersion wavelength $\lambda_0$).

Thereby, in the region of the zero dispersion wavelength, due to the completely unequally spaced channel allocation of $N_1$-channels, it is possible to completely separate the four wave mixing light and the signal beam. In addition, by the combining of the completely unequally spaced channel allocation of the $N_2$-channels, $N_3$-channels, etc., as a whole there is incompletely unequally spaced channel allocation, but because the wavelengths of these signal beams are separated from the zero dispersion wavelengths, the power of the generated four wave mixing light is small, and it is possible to mitigate the influence of the four wave mixing light because of the incompletely unequally spaced channel allocation. For example, by making the first wavelength region $\lambda_0 \pm 10$ [nm], the influence of the four wave mixing light can be made small.

The second characteristic of the present invention derives from the fact that the zero dispersion wavelength of an actual transmission line using a dispersion shifted fiber changes in the longitudinal direction, and based on this fact, a plurality of completely unequally spaced channel allocations are combined.

Actual transmission line connects in sequence dispersion shifted fibers having a length of 2 km. For example, an 80 km transmission line comprising one relay interval connects 40 dispersion shifted fibers. Here, an example of a histogram of the zero dispersion wavelength of a 1.55 μm dispersion shifted fiber is shown in FIG. 2. The number of fiber samples is 100.

As shown in the figure, it can be understood that the zero dispersion wavelengths of the 100 dispersion shifted fibers are not uniform, but scattered. That is, the probability that the zero dispersion wavelength exists is comparatively high in the wavelength region around 1500 μm (here, 1545~1560 nm), and low in the other wavelength regions. Therefore, in the transmission line connecting in sequence this dispersion shifted fiber, it can be understood that the zero dispersion wavelength is scattered (fluctuating) in the longitudinal direction.

The present invention is characterized in that, when
$$N_1 \geq N_2 \geq N_3 \geq \ldots > N_j \geq N_{k-1} \geq N_k,$$
as shown in FIG. 3A, first the $N_1$-channels are chosen so as to have completely unequally spaced channel allocation in the wavelength region where the zero dispersion wavelength exists most frequently. In addition, in the wavelength regions in which the frequency is lower than this wavelength region, the $N_2$ channels, $N_3$-channels, etc., which are smaller than the $N_1$-channels are made completely unequally allocated, and these are combined. That is, the number of channels with completely unequally spaced channel allocation changes depending on the probability with which a zero dispersion wavelength exists. Moreover, in the present Specification, the peak where the zero dispersion wavelength most frequently exists, that is, the mode of the zero dispersion wavelength, will be referred to as the "mode zero-wavelength dispersion wavelength $\lambda_A$".

In addition, the occupied bandwidth with respect to the number of channels with completely unequally spaced channel allocation has the relationship shown in Table 2, and thus by combining a plurality of completely unequally spaced channel allocations, making the number of channels with completely unequally spaced channel allocation small in the wavelength region where the zero-wavelength dispersion exists least frequently, the occupied bandwidth as a whole becomes narrow. That is, in a limited occupied bandwidth, it is possible to allocate many channels. This is identical to the first characteristic of the present invention.

In addition, when combining the plurality of completely unequally spaced channel allocations as described above, the entire frequency interval is not completely unequally allocated. However, this means that the wavelength region where the zero dispersion wavelength exists least frequently is not continuous with the zero dispersion wavelength seen from the transmission line as a whole (the length of the transmission path having this zero dispersion frequency is relatively short), and the power of the generated four wave mixing light is small. Because of this, by combining the completely unequally spaced channel allocations of $N_2$-channels, $N_3$-channels, . . . , as a whole it becomes incompletely unequally spaced channel allocation, but the power of the generated four wave mixing light becomes small, and it is possible to mitigate the influence of the four wave mixing light due to the incompletely unequally spaced channel allocation.

This situation is shown in FIG. 4. This shows the spectrum when carrying out incompletely unequally spaced channel allocation of 16 channels by combining the completely unequally spaced channel allocation of 8 channels with the completely unequally spaced channel allocation of 4 channels, and transmitting over a 640 km of dispersion shifted fibers. In order to suppose the worst conditions, the zero dispersion wavelengths $\lambda_A$ (=1552.52 nm) in each span (80 km) are all equal, and at the standard deviation $\sigma$ (=5 nm) for each 2 km within each relay interval, the zero dispersion wavelength is irregular. The large 16 peaks represent the signal light, and the many small spiked peaks show four wave mixing lights.

From FIG. 4, it can be understood that the signal beam power in the neighborhood of the mode zero dispersion wavelength $\lambda_A$ is comparatively lessened. The cause of this is that the power of the signal beam itself is lessened because it generates new light by four wave mixing. However, channels separated from the mode zero-wave dispersion, for example channel 1 and channel 16, are not contributing almostly the four wave mixing light generation. That is, it can be understood that the power of the generated four wave mixing light is large in the mode zero dispersion wavelength $\lambda_A$ neighborhood. In addition, outside the wavelength region 20 nm ($\lambda_A \pm 2\sigma$) in the neighborhood of the mode zero dispersion wavelength $\lambda_A$, the influence of the four wave mixing is small.

In the example of channel allocation shown in FIG. 3, completely unequally spaced channel allocation of fewer channels is carried out according to the separation from the mode zero dispersion wavelength, and this is identical to FIG. 3A in terms of their being combined. A characteristic of the present example is setting the predetermined wavelength interval $\Delta\lambda_K$ between each of the completely unequally spaced channel allocations. This wavelength interval $\Delta\lambda_K$ is determined by the relationship between the frequency grid defined by ITU-T and the unequally allocated wavelengths, the amplification band, etc. Moreover, FIG. 3A can be said to be the case wherein $\Delta\lambda_K$=0. In addition, in FIG. 3A, the upper limit of the number of partitioned channels is $N_1+N_2+N_3+N_4+N_5-4$. In FIG. 3B, the upper limit of the number of partitioned channels is $N_1+N_2+N_3+N_4+N_5$.

In this manner, in the present invention even when there is incompletely unequal channel allocation as a whole in combining a plurality of completely unequally spaced channel allocations, by changing the number of channels of completely unequally spaced channel allocation according to the amount of dispersion and how frequently the zero dispersion wavelength exists, it is possible to implement both a decreased occupied bandwidth and an increase in the number of channels while mitigating the influence of four wave mixing light.

In addition, by providing a transmission equipment having several means for realizing the above wavelength allocation method and a receiving means for receiving the wavelength multiplexed light transmitted from this transmission equipment, it is possible to construct a wavelength multiplexed transmission system having many channels effectively using the optical amplifier bandwidth.

As explained above, in the present invention, even when there is incompletely unequal channel allocation as a whole in combining a plurality of completely unequally spaced channel allocations, by changing the number of channels of completely unequally spaced channel allocation depending on the amount of chromatic dispersion of the optical fiber and how frequently the zero dispersion wavelength exists, it is possible to implement both a decrease the occupied bandwidth and an increase in the number of channels while mitigating the influence of four wave mixing light. In this manner, it is possible to construct a wavelength multiplexed transmission system with many channels effectively using the optical wavelength band.

BRIEF DESCRIPTION OF THE DRAWINGS

FIG. 1A is a drawing for explaining the characteristic of the present invention.

FIG. 1B is a drawing for explaining the characteristic of the present invention.

FIG. 1C is a drawing for explaining the contrast between the present invention and conventional art.

FIG. 4 is a drawing showing the zero dispersion wavelength position and the transmission spectrum.

FIG. 5 is a drawing showing the simulation results comparing the transmission distance in the conventional example and the embodiment.

Table 1 is one example of completely unequally spaced channel allocation for 8 channels which minimizes the occupied bandwidth.

Table 2 is a chart sowing the minimal occupied bandwidth necessary for completely unequally spaced channel allocation increases according to the number of channels.

Table 3 is a chart showing a occupied bandwidth of the conventional example and present invention.

Table 4 is a chart showing an example of channel arrangement for 24 channels.

DETAILED DESCRIPTION OF THE PREFERRED EMBODIMENT

When combining a plurality of completely unequally spaced channel allocations, as a standard for changing the number of channels with completely unequally spaced channel allocation, a first characteristic of the present invention is using a distribution of the amount of scattering, and a second characteristic is using the distribution of frequency that the zero dispersion wavelength exists, but is it possible to treat these together by making the power of the generated four wave mixing light this standard. That is, in the first characteristic of the present invention, the four wave mixing light generated by the signal light separated from the zero dispersion wavelength is small, and in the second characteristic of the present invention, the power of the four wave mixing light generated by the signal light of the wavelength area where the zero dispersion is least frequent is small, and together the influence of the four wave mixing light due to incompletely unequally spaced channel allocation is mitigated.

Figure 2:
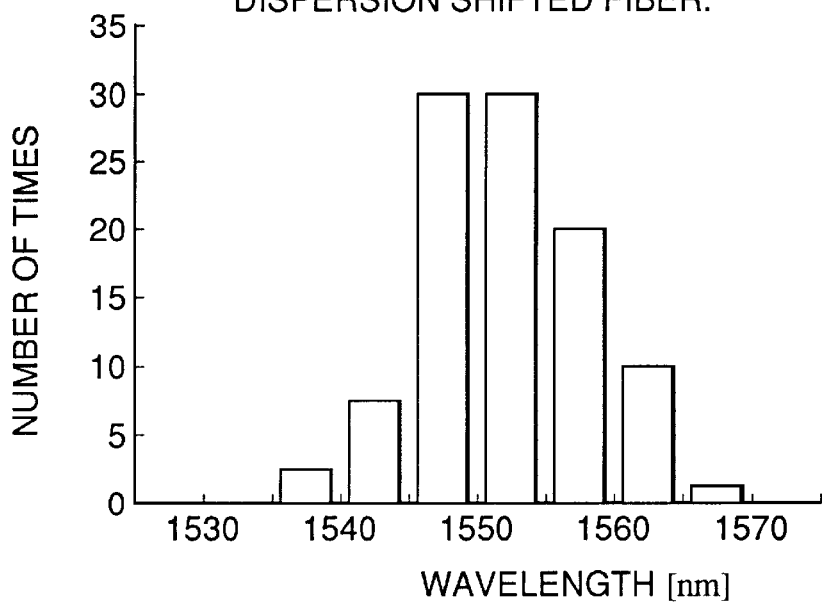
FIG. 2 is a drawing showing an example of a histogram of the zero dispersion wavelength of a 1.55 $\mu$m dispersion shifted fiber.
Figure 3A:
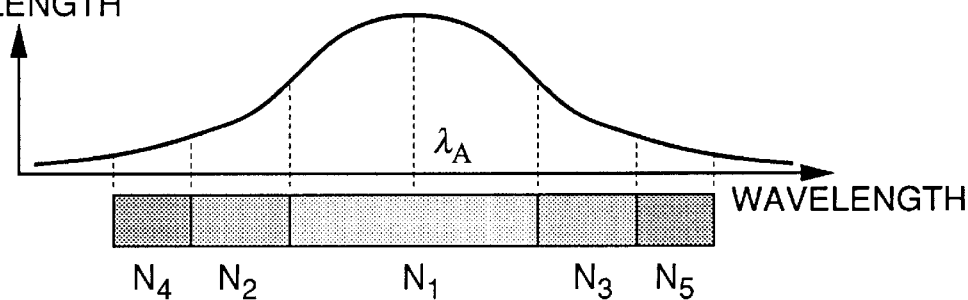
FIG. 3A is a drawing for explaining the second characteristics of the present invention.
Figure 3B:
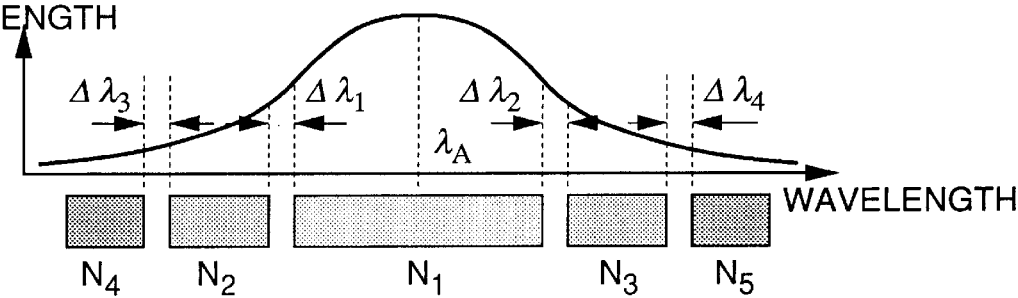
FIG. 3B is a drawing for explaining the second characteristics of the present invention.
Figure 6A:
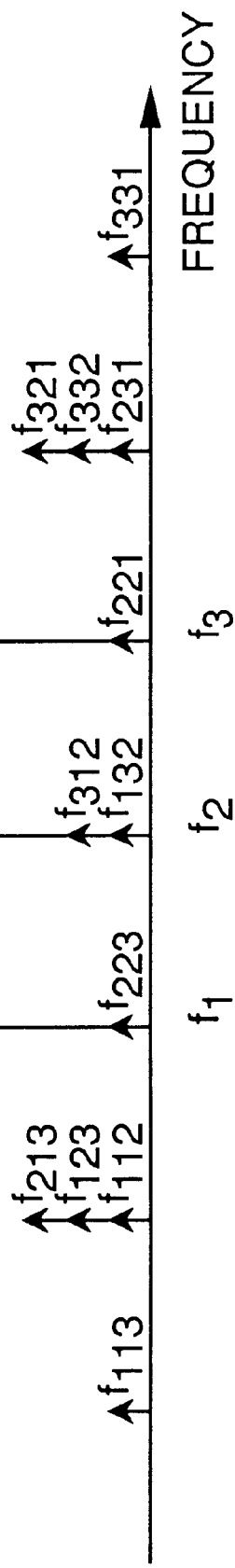
FIG. 6A is a drawing showing the position of the generation the four wave mixing light.
Figure 6B:
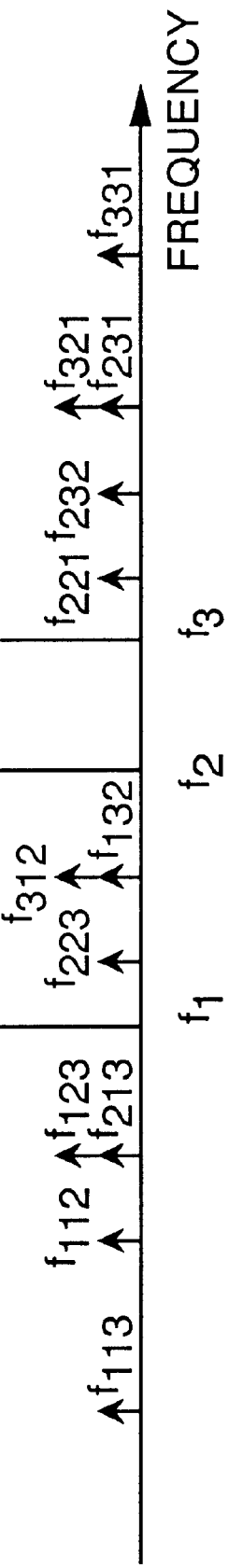
FIG. 6B is a drawing showing the position of the generation the four wave mixing light.

That is, the ordinate of FIGS. 3A and 3B shows the power of the generated four wave mixing light, and even if, for example, the four wave mixing light generated between the signal light included respectively in $N_1$ and $N_2$ and the four wave mixing light generated between the signal beams included respectively in $N_2$ and $N_4$, etc., cannot be separated form the signal beam because of incompletely unequally space channel allocation, the power is very small and can be treated as having almost no influence.

In addition, in FIGS. 3A and 3B, even if, for example, the wavelength regions of $N_4$ and $N_5$ have even channel spacing, the power of the generated four wave mixing light is small, and can be treated as having almost no influence. In this case, it is possible to make the occupied bandwidth even more narrow, and it is possible to increase the number of channels that can be accommodated.

Below, an example of a concrete channel allocation based on the second characteristic of the present invention will be explained. Moreover, an example of the channel allocation based on the first characteristic can also be explained in the same manner.

As shown in FIGS. 3A and 3B, if the histogram of the zero dispersion wavelength of the transmission line can be approximated by a normal distribution, when the mode (=average value) of the normal distribution is $\lambda_A$ [nm] and the standard deviation is $\sigma$ [nm], the probability with which the zero dispersion wavelength exists in the wavelength region of $\lambda_A \pm 2\sigma$ is 95%. Therefore, when $\sigma=5$ nm, that is, when the probability with which the zero dispersion wavelength exists in the wavelength region of 20 nm, the probability with which the zero dispersion wavelength exists in this outside of this region is only 5%.

In addition, channel spacing that are integer multiples of 50 GHz are provided, and among the completely unequally spaced channel allocations of the 8-channel having a minimum channel interval of 150 GHz, the occupied bandwidth is 17.23 nm, as shown in Table 2. Therefore, when minimum carried out the allocation of 16 channels, in the wavelength region of 20 nm, where the zero dispersion wavelength is most frequent, completely unequally spaced channel allocation for 8 channels having an occupied bandwidth of 17.23 nm is carried out, and the completely unequally spaced channel allocation of the 4 channels adjacent to these is carried out.

An example of the channel allocation for 16 channels based on the above conditions is shown in FIG. 3. Moreover, the embodiment provides a wavelength interval of about 1.6 nm (200 GHz) between the completely unequally spaced channel allocation for 8 channels and completely unequally spaced channel allocation for 4 channels. In addition, for reference as a conventional example, the case of combining only completely unequally spaced channel allocation for 8 channels is also shown. In this conventional example, channels 2 and 9 are shared as adjacent channels with completely unequally spaced channel allocation. The mode zero dispersion wavelength $\lambda_A$ of both is 1552.52 nm.

As is clear from this Table, the occupied bandwidth of the conventional example is 35.26 nm, while the occupied bandwidth of the embodiment is 30.03 nm. Thereby, the occupied bandwidth falls within the amplification bandwidth (about 30 nm) of the generally used optical fiber amplifier.

In addition, FIG. 5 shows the calculated transmission light with the channel allocation shown in Table 3. As is clear from this Table, there is almost no difference. For example, the range of the total fiber input which can reach a transmission distance of 640 km is 8~18 dBm in the conventional method, and 8~17 dBm in the embodiment, which is a difference of merely 1 dB. In contrast, the effect of being able to narrow the occupied bandwidth by about 5 nm is great.

Table 4 shows an example of channel arrangement for 24 channels. Here, there is a combination of 4 channels, 8 channels, 8 channels, 4 channels, and 4 channels in completely unequally spaced channel allocation, and channels 4, 11, 18 and 21 are shared as adjacent channels having completely unequally spaced channel allocation. The mode zero dispersion frequency $\lambda_A$ is 1552.52 nm.

Here, in the case of allocating 8 channels, all the completely unequally spaced channel allocation of the 8 channels (channels 11~18) are partitioned. When allocating 10 channels, for example, all of the completely unequally spaced channel allocation of 8 channels (channels 11~18), part (channel 10) of the completely unequally spaced channel allocation of 8 channels (channels 4~11), and part (channel 9) of the completely unequally spaced channel allocation of 4 channels (channels 18~21) are partitioned. Below, in the same manner, the allocation of, for example, 12 channels, 16 channels, 20 channels, etc., is carried out using the channels marked with the asterisk (*) in Table 4. The selection of these channels is arbitrary, and decided depending on the amplification bandwidth of the optical amplifier and the chromatic dispersion characteristics of the transmission line.

Above, in the example of channel allocation in Tables 3 and 4, the minimum frequency difference Δf between the signal beams and the four wave mixing light is 50 GHz, and the wavelength interval for each channel is an integer multiple of 50 GHz, but this is identical to the case where Δf=25 GHz and the wavelength interval of each channel being an integer multiple of 25 GHz.

By providing a transmission equipment having each of the means for realizing the above wavelength allocation method and a receiving equipment which receives the wavelength multiplexed light sent form this transmission equipment, it is possible to build a multi-channel optical transmission system effectively using the optical wavelength band.

TABLE 1

| CHANNEL NUMBER | FREQUENCY [THz] | WAVELENGTH [nm] | CHANNEL SPACING [GHz] |
|---|---|---|---|
| 1 | 194.45 | 1541.75 | |
| | | | 250 ( = 5 × 50) |
| 2 | 194.20 | 1543.73 | |
| | | | 500 ( = 10 × 50) |
| 3 | 193.70 | 1547.72 | |
| | | | 400 ( = 8 × 50) |
| 4 | 193.30 | 1550.92 | |
| | | | 200 ( = 4 × 50) |
| 5 | 193.10 | 1552.52 | |
| | | | 350 ( = 7 × 50) |
| 6 | 192.75 | 1555.34 | |
| | | | 300 ( = 6 × 50) |
| 7 | 192.45 | 1557.77 | |
| | | | 150 ( = 3 × 50) |
| 8 | 192.30 | 1558.98 | |

TABLE 2

| CHANNEL NUMBER | OCCUUPIED BANDWIDTH [nm] |
|---|---|
| 1 | 4.8 |
| 2 | 14.23 |
| 3 | 44 |

TABLE 3

| | | CONVENTIONAL METHOD | | EMBODIMENT | |
|---|---|---|---|---|---|
| CHANNEL NUMBER | | FREQUENCY [THz] | WAVELENGTH [nm] | FREQUENCY [THz] | WAVELENGTH [nm] |
| 1 | 8 | 196.75 | 1523.72 | 196.05 | 1529.16 |
| 2 | | 196.60 | 1524.89 | 195.80 | 1531.11 |
| 3 | | 196.35 | 1526.83 | 4 | 195.60 | 1532.68 |
| 4 | | 195.85 | 1530.73 | | 195.45 | 1533.86 |
| 5 | 8 | 195.45 | 1533.86 | | 195.25 | 1535.43 |
| 6 | | 195.25 | 1535.43 | 4 | 195.00 | 1537.40 |
| 7 | | 194.90 | 1538.19 | | 194.80 | 1538.98 |
| 8 | | 194.60 | 1540.56 | | 194.65 | 1540.16 |
| 9 | | 194.45 | 1541.75 | | 194.45 | 1541.75 |
| 10 | | 194.20 | 1543.73 | | 194.20 | 1543.73 |
| 11 | | 193.70 | 1547.72 | | 193.70 | 1547.72 |
| 12 | 8 | 193.30 | 1550.92 | 8 | 193.30 | 1550.92 |
| 13 | | 193.10 | 1552.52 | | 193.10 | 1552.52 |
| 14 | | 192.75 | 1555.34 | | 192.75 | 1555.34 |
| 15 | | 192.45 | 1557.77 | | 192.45 | 1557.77 |
| 16 | | 192.30 | 1558.98 | | 192.30 | 1558.98 |

TABLE 4

| Channel Number | Frequency [Thz] | Wavelength [nm] | 8 ch | 10 ch | 12 ch | 16 ch | 20 ch |
|---|---|---|---|---|---|---|---|
| 1 | 197.20 | 1520.25 | | | | | |
| 2 | 196.95 | 1522.18 | | | | | |
| 3 | 4 { 196.75 | 1523.72 | | | | | * |
| 4 | 196.60 | 1524.89 | | | | * | * |
| 5 | 196.35 | 1526.83 | | | | * | * |
| 6 | 195.85 | 1530.73 | | | | * | * |
| 7 | 195.45 | 1533.86 | | | | * | * |
| 8 | 8 { 195.25 | 1535.43 | | | * | * | * |
| 9 | 194.90 | 1535.19 | | | * | * | * |
| 10 | 194.60 | 1540.56 | | * | * | * | * |
| 11 | 194.45 | 1541.75 | * | * | * | * | * |
| 12 | 194.20 | 1543.73 | * | * | * | * | * |
| 13 | 193.70 | 1547.72 | * | * | * | * | * |
| 14 | 193.30 | 1550.92 | * | * | * | * | * |
| 15 | 8 { 193.10 | 1552.52 | * | * | * | * | * |
| 16 | 192.75 | 1555.34 | * | * | * | * | * |
| 17 | 192.45 | 1557.77 | * | * | * | * | * |
| 18 | 192.30 | 1558.98 | * | * | * | * | * |
| 19 | 192.05 | 1561.01 | * | * | * | * | * |
| 20 | 4 { 191.85 | 1562.64 | | | | * | * |
| 21 | 191.70 | 1563.86 | | | | * | * |
| 22 | 191.45 | 1565.90 | | | | | * |
| 23 | 4 { 191.25 | 1567.54 | | | | | |
| 24 | 191.100 | 1569.59 | | | | | |

What is claimed is:

1. A wavelength allocation method applying to a wavelength division multiplexing transmission system in which signal lights of N channels (N is an integer equal to or greater than 3) are multiplexed and transmitted through an optical fiber with a zero dispersion wavelength $\lambda_0$, wherein:

when the case of the frequency interval of any arbitrary frequency intervals is different from the frequency interval of any two other frequencies is called "completely unequally spaced channel allocation" in the frequency interval of a plurality of channels, completely unequally spaced channel allocation for $N_1$-channels among said N-channels in a first wavelength region that includes said zero dispersion wavelength $\lambda_0$, is carried out; next completely unequally spaced channel allocation of $N_2$-channels among said N-channels in a second wavelength region adjacent to said first wavelength region is carried out; subsequently in the same manner completely unequally spaced channel allocation of $N_3$-, $N_4$-, ..., $N_k$-channels (where the integers $N_1$ and $N_k$ respectively indicating the number of channels included in the wavelength regions from 1 to k satisfy the relationship $N_1 \geq N_2 \geq \ldots > N_j \geq N_{k-1} \geq N_k$, and at least 2 of the integers $N_1$ through $N_k$ are different numbers) is carried out; and carrying out the allocation of wavelengths by setting the wavelength intervals of said N channels by combining all of said wavelength allocations included in the wavelength region for which said completely unequally spaced wavelength allocation has been carried out, or a part of the wavelength allocations included in the wavelength region outside of said first wavelength region for which completely unequally spaced wavelength allocation has been carried out, with the wavelength allocation included in said first wavelength region.

2. A wavelength allocation method according to claim 1 characterized in providing wavelength intervals depending on the frequency grid between each wavelength region wherein completely unequally spaced channel allocation is carried out.

3. A wavelength allocation method according to claim 2 characterized in that the wavelength interval of each channel is an integer multiple of 50 GHz.

4. A wavelength allocation method according to claim 2 characterized in that the wavelength interval of each channel is an integer multiple of 25 Ghz.

5. A wavelength allocation method applying to a wavelength division multiplexing transmission system signal lights of N channels (N is an integer equal to or greater than 3) are multiplexed and transmitted through a transmission fiber using an optical fiber, wherein:

the zero dispersion wavelength of said transmission fiber is distributed having a specified probability in the signal beam band, and the zero dispersion wavelength existing most frequently is made the "mode zero dispersion wavelength $\lambda_A$", when the case of the frequency interval of any two arbitrary frequency intervals is different from the frequency interval of any two other frequencies is called "completely unequally spaced channel allocation" in the frequency interval of a plurality of channels, completely unequally spaced channel allocation for $N_1$-channels among said N-channels in a first wavelength region that includes said mode zero dispersion wavelength $\lambda_A$, is carried out; next completely unequally spaced channel allocation of $N_2$-channels among said N-channels in a second wavelength region, in which zero dispersion wavelength existing probability is lower than that in the first wavelength region, is carried out;

subsequently in the same manner completely unequally spaced channel allocation of $N_3$-, $N_4$-, ..., $N_k$-channels (where the integers $N_1$ and $N_k$ respectively indicating the number of channels included in the wavelength regions from 1 to k satisfy the relationship $N_1 \geq N_2 \geq \ldots > N_j \geq N_{k-1} \geq N_k$, and at least 2 of the integers $N_1$ through $N_k$ are different numbers) is carried out; and carrying out setting of the wavelength intervals of said N-channels by combining all of said wavelength allocations included in the wavelength region for which said completely unequally spaced wavelength allocation has been carried out, or a part of the wavelength allocations included in the wavelength region outside of said first wavelength region for which completely unequally spaced wavelength allocation has been carried out, with the wavelength allocation included in said first wavelength region; and the value of said $N_k$ is determined according to the bandwidth of an optical amplifier used in transmission.

6. A wavelength allocation method according to claim 5 characterized in that the wavelength interval of each channel is an integer multiple of 50 Ghz.

7. A wavelength allocation method according to claim 5 characterized in that the wavelength interval of each channel is an integer multiple of 25 GHz.

8. A wavelength allocation method according to claim 5 characterized in providing wavelength intervals depending on the frequency grid between each wavelength region wherein completely unequally spaced channel allocation is carried out.

9. A transmission equipment that wavelength multiplexes and sends signal lights of N-channels (N is an integer equal to or greater than 3) through an optical fiber with a zero dispersion wavelength $\lambda_0$, comprising when the case of the frequency interval of any two arbitrary frequency intervals is different from the frequency interval of any two other frequencies is called "completely unequaled spaced channel allocation" in the frequency interval of a plurality of channels:

a means for carrying out completely unequally spaced channel allocation of $N_1$-channels among said N-channels in the first wavelength region including said zero dispersion wavelength $\lambda_0$;

a means for carrying out completely unequally spaced channel allocation for $N_2$-channels among said N-channels in a second wavelength region adjacent to said first wavelength region;

a means which subsequently carries out in the same manner completely unequally spaced channel allocation for $N_3, N_4, \ldots, N_k$ channels (where the integers $N_1$ and $N_k$ respectively indicating the number of channels included in the wavelength regions from 1 to k satisfy the relationship $N_1 \geq N_2 \geq \ldots > N_j \geq N_{k-1} \geq N_k$, and at least 2 of the integers $N_1$ through $N_k$ are different numbers); and a means which carries out the allocation of wavelengths by setting the wavelength intervals of said N channels by combining all of said wavelength allocations included in the wavelength region for which said completely unequally spaced wavelength allocation has been carried out, or a part of the wavelength allocations included in the wavelength region outside of said first wavelength region for which completely unequally spaced wavelength allocation has been carried out, with the wavelength allocation included in said first wavelength region.

10. A transmission equipment according to claim 9 comprising a means that sets the wavelength interval according to the frequency grid between each wavelength region that carries out completely unequally spaced channel allocation.

11. A transmission equipment according to claim 10 comprising a means which makes the wavelength interval of each channel an integer multiple of 50 Ghz.

12. A transmission equipment according to claim 10 comprising a means which makes the wavelength interval of each channel an integer multiple of 25 Ghz.

13. A receiving equipment characterized in having a means which receives a multiplexed signal of N-channels (N is an integer equal to or greater than 3) sent from the transmission equipment disclosed in claim 9.

14. A wavelength multiplexing transmission system according to claim 13, wherein a signal beam of N-channels (wherein N is an integer equal to or greater than 3) is wavelength multiplexed and transmitted via an optical fiber having a zero dispersion wavelength $\lambda_0$.

15. A transmission equipment that wavelength multiplexes and sends signal lights of N channels (N is an integer equal to or greater than 3) through a transmission path using an optical fiber, wherein:

the zero dispersion wavelength of said transmission path is distributed having a specified probability in the signal beam band, and the zero dispersion wavelength existing most frequently is made the "mode zero dispersion wavelength $\lambda_A$", and characterized in comprising when the case of the frequency interval of any two arbitrary frequency intervals is different from the frequency interval of any two other frequencies is called "completely unequally spaced channel allocation" in the frequency interval of a plurality of channels:

a means which carries out completely unequally spaced channel allocation of $N_1$-channels among said N-channels in a first wavelength region that includes said mode zero dispersion wavelength $\lambda_A$, a means which carries out completely unequally spaced channel allocation of $N_2$-channels among said N-channels in a second wavelength region where the zero dispersion wavelength exists less frequently than said first wavelength region;

a means which subsequently carries out completely unequally spaced channel allocation for $N_3, N_4, \ldots, N_k$ channels (where the integers $N_1$ and $N_k$ respectively indicating the number of channels included in the wavelength regions from 1 to k satisfy the relationship $N_1 \geq N_2 \geq \ldots > N_j \geq N_{k-1} \geq N_k$, and at least 2 of the integers $N_1$ through $N_k$ are different numbers); and a means which carries out setting of the wavelength intervals of said N channels by combining all of said wavelength allocations included in the wavelength region for which said completely unequally spaced wavelength allocation has been carried out, or a part of the wavelength allocations included in the wavelength region outside of said first wavelength region for which completely unequally spaced wavelength allocation has been carried out, with the wavelength allocation included in said first wavelength region; and a means which determines the value of said $N_k$ according to the waveband of an optical amplifier used in transmission.

16. A transmission equipment according to claim 15 comprising a means which makes the wavelength interval of each channel an integer multiple of 50 Ghz.

17. A transmission equipment according to claim 15 comprising a means which makes the wavelength interval of each channel an integer multiple of 25 Ghz.

18. A receiving equipment characterized in having a means which receives a multiplexed signal of N-channels (N is an integer equal to or greater than 3) sent from the transmission equipment disclosed in claim 17.

19. A transmission equipment according to claim 15 comprising a means that sets the wavelength interval according to the frequency grid between each wavelength region that carries out completely unequally spaced channel allocation.

* * * * *